Jan. 21, 1969  J. M. H. JACOBS ET AL  3,423,076
MIXING APPARATUS
Filed May 6, 1966

GATE VALVE

INVENTORS
JACQUES M.H. JACOBS,
ANDREAS A.M. HERMSEN,
AALBERT JAN HENDRIKS
GERHARDUS A.M. TEELING
BY Stevens, Davis, Miller & Mosher
ATTORNEYS 3,423,076
MIXING APPARATUS
Jacques M. H. Jacobs, Rozendaal, Gelderland, Andreas A. M. Hermsen, Rheden, and Aalbert J. Hendriks and Gerhardus A. M. Teeling, Arnhem, Netherlands, assignors to American Enka Corporation, Enka, N.C., a corporation of Delaware
Filed May 6, 1966, Ser. No. 548,114
Claims priority, application Netherlands, May 12, 1965, 6506004
U.S. Cl. 259—180       2 Claims
Int. Cl. B01f 5/00; B28c 5/04

ABSTRACT OF THE DISCLOSURE

A mixing apparatus having a plurality of adjacent and interconnected compartments which communicate at different levels, inlet means for discharging materials to be mixed into one of the compartments, the inlet means discharging into that compartment which communicates with an adjacent compartment at the lowest level, whereby material emerging from the inlet means first fills the one compartment to the lowest level and thereafter overflows the compartment to fill the remaining compartment to different levels in sequence and outlet means for discharging material simultaneously from all of the compartments to effect mixing thereof.

---

Figure 1:
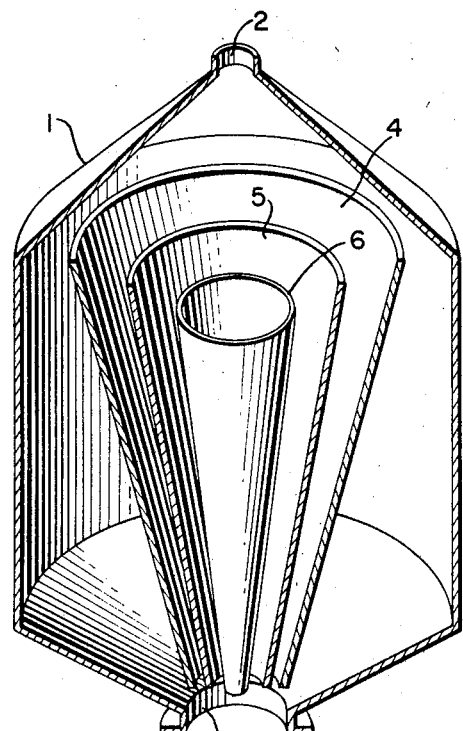

This invention relates to an apparatus for mixing materials which fluctuate in quality to produce a product having more uniform quality. More particularly, this invention relates to a mixing apparatus having a plurality of adjacent and interconnecting compartments for storing materials which are arranged for sequential loading from an inlet and for discharging simultaneously together through a common outlet to effect mixing of the discharged materials.

In the processing of granular substances, powders, liquids, molten substances, and other materials which are produced from sources having outputs of fluctuating quality, it is a common practice to blend or mix the materials to produce mixtures having a uniform quality more suitable for their intended use. Such materials include by way of example, coal, metal ores, and other minerals produced by mining, salt precipitates, polymers, and other chemical manufactures and the like materials, the quality of which may fluctuate.

Heretofore, it has been known to mix such materials by devices having a plurality of adjacent chambers or compartments which are connected to a common outlet. One of such known devices is provided with a scraper conveyor placed adjacent to the tops of a plurality of compartments. After one compartment is filled, the conveyor scrapes the overflow of material into the second compartment. After the second compartment is filled, material is scraped over into a third compartment and so on until the last compartment of the device has been filled. When all of the compartments are filled, they are discharged simultaneously into a common delivery system such as a conveyor or the like. In such devices, the conveyors require several moving parts including a drive mechanism and the like.

In another known device, a group of adjacent compartments within a container are filled by a swinging chute to ensure distribution of the material over the entire group of compartments. After the compartments are loaded in this manner, they are simultaneously discharged at different levels in the container from controlled outlets that feed through conduits into a common receiving container or compartment. Often such devices are also provided with a screw conveyor or other type mechanism to ensure that the material collected in the receiving department is effectively mixed and removed.

Thus, it will be recognized that many of the known mixing devices usually require moving parts such as conveyors, swinging chutes, and the like to effect sequential or random-like loading of materials into the different compartments. Such loading devices require elaborate control systems for operating in the proper sequence and also necessitate the use of motors and other power sources. It will be appreciated that these distributing arrangements are costly, space consuming, and may cause fluctuations in quality of the resulting mixtures because of the failure of their moving parts to properly operate in their timed sequence.

Advantageously, in accordance with this invention, there is provided an apparatus for mixing granular and the like materials which has a plurality of adjacent and interconnected compartments that are sequentially charged without the use of moving conveyors or the like and that discharge simultaneously to effect mixing of the materials.

In particular, this invention contemplates a mixing apparatus comprising a plurality of adjacent and interconnected compartments which communicate at different levels, an inlet arranged for directing material to be mixed into one of the compartments, the inlet initially debouching or discharging material into that one compartment which communicates at the lowest level with another compartment whereby material emerging from said inlet first fills the one compartment to the lowest level and thereafter fills the remaining compartments to different levels in sequence, and a common outlet for simultaneously discharging material from the compartments to effect mixing thereof.

In operation, when the material to be mixed is supplied via the inlet, the first compartment of the mixing apparatus into which the material is discharged will be filled until the level is reached at which this compartment communicates with another compartment. The continuously supplied material then flows over into a second compartment until that level is reached at which the second compartment communicates with a third compartment. Then the material supplied flows over into the third compartment and so on, until all the compartments are filled.

Thereupon, the supply of material to the mixing apparatus is stopped and the common outlet for all the compartments is opened. Consequently, all the compartments then discharge simultaneously. Because the compartments discharge simultaneously, the materials from the different compartments are mixed, so that any fluctuations in quality in the stream of material supplied to the mixing apparatus are to a large extent eliminated.

It will be appreciated that these mixing apparatus may be used for homogenizing or blending of a variety of granular and liquid materials. Examples of the granular materials that can be mixed in a particularly effective manner are those used in the manufacture of threads, films and other shaped articles by the melt spinning, extrusion and injection moulding processes. These materials may be composed of polyolefins, such as polyethylene and polypropylene, polyamides, polyesters and glass. Exemplary of suitable liquid materials are oils and thread and film-forming solutions.

When the apparatus according to the invention is used for blending liquids, it is necessary that, during filling, each compartment should be separately closed at its bottom end. For example, the bottom of the compartment may be provided with a passage that is closed by a gate-type valve or with a valve alone. In this way the overflow of the materials from the compartment into which the inlet discharges takes place only at the upper portions of the compartments.

For homogenizing granular materials which have different flow characteristics, this requirement for separate closures need not be made. In such cases, the compartments may, during filling, be in open communication with one another at their bottom ends, the common outlet being provided with a single closing device,—e.g., a gate-type valve.

It will be understood that in cases where the compartments are open, the width of the free passages provided at the bottom ends or portions of the compartments depends on the granular size of the material being mixed.

It will be appreciated that various constructions are contemplated for the mixing apparatus of this invention. For instance, in one embodiment of the invention, a series of compartments are formed inside a container by means of a number of concentric partitions. At the top of each partition there is provided a space relative to the upper wall or top of the container. Also, an inlet and an outlet are provided at the top and the bottom of the container, respectively.

The annular partitions of an apparatus of this type are so constructed that the heights of their upper edges increase as they are placed further outwards from the center of the apparatus. The inlet of the apparatus in this case is arranged to discharge into the centrally located compartment, and the compartments are often closably connected to the common outlet at their bottom ends.

In the operation of this apparatus the material supplied first fills the central compartment. Then the continuously supplied material flows over the brim of the partition forming the central compartment into a second compartment until it is also filled. In the same way, a third and any additional compartments are filled in sequence.

As soon as all the compartments are filled, the supply of material is stopped and the outlets of the compartments are opened. As a result, the compartments discharge simultaneously through the common outlet thus effecting a thorough homogenization of granular or the like material.

It will be understood that the concentric or annular partitions may be cylindrical, conical or partly cylindrical and partly conical, depending on the requirements of a specific application. In general, the partitions should be so shaped that when the outlet of the container is opened, the contents of all the compartments empty simultaneously.

Thus, in the case of the compartments having unequal capacities, the rate of flow of the material discharging from the largest compartment will have to be made highest, for example, by regulating the spacing between adjacent annular partitions at the bottom of each compartment.

If the apparatus is used for homogenizing or blending granular material, the partitions need not extend down as far as the bottom of the container. In which case, the compartments may each have closable connections, conduits or passages, to the common outlet. But it is also possible to leave a space between the lower ends of the partitions and the bottom of the container and to provide the container with a single closable outlet. Thus, in either case, the compartments are arranged to discharge simultaneously through the common outlet.

Instead of the annular partitions, the apparatus of this invention may also comprise a container divided into compartments by means of radial partitions. In such case, the top edges of the partitions forming the compartments should not only leave a space relative to the upper wall or top of the container but (starting from the compartment into which the inlet of the apparatus discharges and viewed in either one or in two opposite peripheral directions), the partitions should also have increasing heights. Also, the partitions bounding the inlet compartment should be unequal in height.

According to the invention, in mixing apparatus which have a container divided into compartments by means of radial partitions, the compartments may communicate at differing levels in a way other than by means of partitions having upper edges of unequal heights.

Thus, in a still different embodiment of the invention, the inlet of the apparatus consists of a tube which discharges at its bottom end into one of the compartments formed by a series of radial partitions. The tube wall is also provided with other openings spaced at different heights, each of which forms a passage to another compartment. In this embodiment, the compartments are also closably connected at their bottom portions to a common outlet.

Upon supplying material to be homogenized through the tube, the compartment into which the bottom end of the tube discharges is filled to the tube wall opening next above the bottom end. The material then flows into a second compartment until the level of the next higher opening is reached. Then, a third compartment is filled and any additional compartments are filled in sequence until all the compartmens are filled.

It will be appreciated that as in the case of the other enumerated embodiments, the compartments need not be provided with separately closable outlets for mixing of granular and the like materials.

Figure 2:
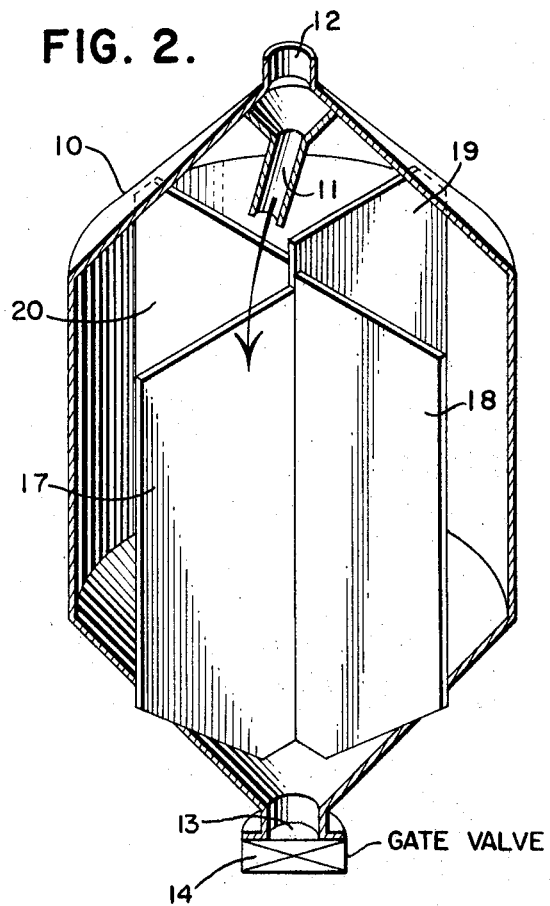

The invention will be further understood with reference to the accompanying drawings showing various specific embodiments, which are not, however, intended to limit the scope of the invention and in which:

FIGURE 1 is a schematic representation of a first embodiment of the present mixing apparatus;

FIGURE 2 schematically represents a second embodiment of the apparatus; and

Figure 3:
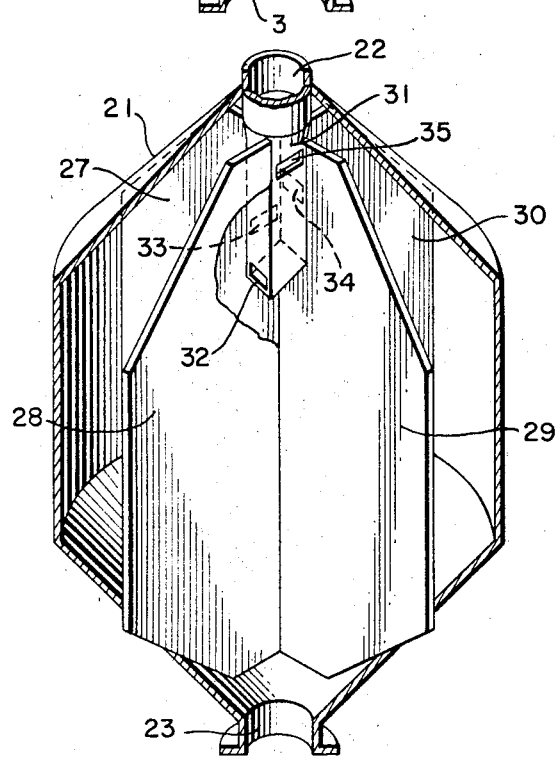

FIGURE 3 shows a third embodiment.

In FIGURE 1 the reference numeral 1 refers to a container of a mixing apparatus of this invention which, at its top end, is provided with an inlet 2 and at its bottom end with a closable outlet 3.

In the container 1 three conical partitions, 4, 5, and 6 are positioned in a fixed manner by supports which are not shown. This apparatus is designed to be used for homogenizing granular material. Therefore, it is not necessary for each of the compartments formed by means of the partitions 4, 5, and 6 and the wall of the container 1 to be provided with separate closable outlets. With such apparatus there is only need for one closable outlet 3.

When an apparatus of this embodiment is used for the discontinuous mixing of granular material, the inlet 2 is opened and the outlet 3 closed by means not shown. The material supplied flows down into the central compartment enclosed by the partition 6 until this compartment is filled. The granular material now penetrates into the other compartments up to a limited height via the open bottom portion of the central compartment.

As soon as the central compartment is filled, the continuously supplied material flows over into the compartment formed between the partitions 6 and 5. The different heights between partitions 6 and 5 already at this stage prevent the material from entering the compartments between partitions 5 and 4, and between the partition 4 and the wall of the container 1.

After the compartment between the partitions 6 and 5 has been filled, the material supplied flows over into the next compartment.

As soon as all the compartments are filled, the supply is stopped by closing the inlet 2. The outlet 3 is then opened. All the compartments now discharge simultaneously.

In the embodiment according to FIGURE 2, there are mounted in the container 10, which is provided with an inlet 12 and an outlet 13, four radial partitions, 17, 18, 19 and 20. A gate valve 14 is provided to close off the outlet 13 and is actuated by a control means (not shown). Tube 11 which is connected to the inlet 12 discharges into the compartment defined by partitions 17 and 18.

Starting with this compartment and viewed in two opposite directions, the partitions increase in height; the partitions 17 and 18 being unequal in height.

From the inlet 12, the material to be homogenized is supplied through the tube 11 and flows down into the compartment between the partitions 17 and 18 and the container wall. As soon as this compartment is filled. The material flows over the partition 17 and—after the next compartment is filled—over the partition 18 and finally over the partition 20.

In the embodiment shown in FIGURE 3 a container 21, which has an inlet 22 and a closable outlet 23, is also provided with four radial partitions, 27, 28, 29 and 30. Each of the partitions at their bottom ends leaves a passage beneath the compartments formed by the partitions. To the inlet 22 there is connected a tube 31 which, at its bottom end, is provided with an opening 32 which forms a passage to the compartment formed by the partitions 27 and 28. Moreover, the tube is, at different heights, provided with passages to the remaining compartments. An opening 33 leads to the compartment enclosed by the partitions 27 and 30, opening 34 to the compartment enclosed by the partitions 29 and 30, and opening 35 to the fourth compartment enclosed by the partitions 28 and 29.

When granular material is supplied to the apparatus via the tube 31, the various compartments are charged in sequence and, after the outlet 23 has been opened, discharged simultaneously.

In order that the embodiment may be used for homogenizing liquids, the compartments should each be provided with a closable passage to the common outlet, so as to prevent the compartments from being filled simultaneously via the passage beneath the partitions.

It will be appreciated that the valves or other means used to close off each compartment separately or the common outlet alone may be opened and closed manually or automatically by various conventional pneumatic, electric, or mechanical control systems.

While the novel features of the invention have been described and are pointed out in the appended claims, it is to be understood that various modifications and alterations in construction may be made by those skilled in the art without departing from the spirit and scope of the invention.

What is claimed is:

1. A mixing apparatus comprising a container, a plurality of adjacent and interconnected compartments which communicate at different levels within said container, said compartments being formed by a number of radially arranged partitions positioned within said container, the tops of the partitions being spaced from the top wall of the container, inlet means for discharging material to be mixed into one of said compartments, said inlet means discharging into that one compartment which communicates with an adjacent compartment at the lowest level, one of the two partitions that form said one compartment having a height equal to said lowest level and the other partition of the two having a height equal to the next lowest level, and the remaining partitions having heights greater than the heights of said two partitions, whereby material emerging from the inlet means first overflows the compartment to fill said one compartment to said lowest level and thereafter fills the remaining compartments to different levels in sequence, and outlet means for discharging material simultaneously from all of said compartments to effect mixing thereof.

2. The apparatus of claim 1 in which the said outlet means includes a closable common outlet open to all of said compartments.

References Cited

UNITED STATES PATENTS

| 2,455,572 | 12/1948 | Evans | 259—180 |
| 3,091,369 | 5/1963 | Sackett | 259—150 XR |
| 3,216,629 | 11/1965 | Goins | 259—180 XR |

WALTER A. SCHEEL, *Primary Examiner.*

J. M. BELL, *Assistant Examiner.*

U.S. Cl. X.R.

259—150, 4